(12) United States Patent
Kim et al.

(10) Patent No.: US 8,104,690 B2
(45) Date of Patent: Jan. 31, 2012

(54) SMART CARD SYSTEM AND OPERATING METHOD THEREOF

(75) Inventors: Eui-Seung Kim, Suwon-si (KR); Jong-Cheol Kim, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 477 days.

(21) Appl. No.: 12/353,364

(22) Filed: Jan. 14, 2009

(65) Prior Publication Data

US 2009/0194598 A1    Aug. 6, 2009

(30) Foreign Application Priority Data

Jan. 31, 2008    (KR) .................. 10-2008-0010268

(51) Int. Cl.
*G06K 19/06* (2006.01)
(52) U.S. Cl. ........................................ 235/492; 235/486
(58) Field of Classification Search .................. 235/382, 235/380, 492, 493, 486, 487
See application file for complete search history.

(56) References Cited

U.S. PATENT DOCUMENTS

| | | | | |
|---|---|---|---|---|
| 5,416,423 | A  * | 5/1995 | De Borde | 324/677 |
| 6,535,136 | B1 * | 3/2003 | Rodenbeck et al. | 340/686.6 |
| 7,002,782 | B2 * | 2/2006 | Hasegawa et al. | 360/324.12 |
| 7,622,944 | B2 * | 11/2009 | Ziomek | 326/8 |
| 2006/0028340 | A1 * | 2/2006 | Hooghan et al. | 340/561 |
| 2006/0250239 | A1 * | 11/2006 | Melton | 340/568.2 |
| 2008/0150574 | A1 * | 6/2008 | Ziomek | 326/8 |

FOREIGN PATENT DOCUMENTS

| | | |
|---|---|---|
| EP | 1113386 A2 | 7/2001 |
| KR | 1997-071358 | 11/1997 |
| KR | 1020040071509 | 8/2004 |
| KR | 1020050054776 A | 6/2005 |

* cited by examiner

*Primary Examiner* — Thien M Le
(74) *Attorney, Agent, or Firm* — F. Chau & Associates, LLC

(57) ABSTRACT

A smart card system having: a smart card including a security logic circuit to detect an external attack; and a reader communicating with the smart card. The security logic circuit detects the external attack by measuring the external input capacitance through an input/output pad of the smart card and comparing the external input capacitance to the input capacitance of the reader. This improves the security of the smart card system.

13 Claims, 6 Drawing Sheets

SMART CARD SYSTEM AND OPERATING METHOD THEREOF

CROSS-REFERENCE TO RELATED APPLICATION

This U.S. non-provisional patent application claims priority under 35 U.S.C. §119 of Korean Patent Application No. 10-2008-0010268 filed on Jan. 31, 2008, the entire contents of which are incorporated herein by reference.

BACKGROUND

The present disclosure relates to smart card systems. In particular, the present disclosure relates to a smart card system that can detect an external attack and an operating method for a smart card system.

Integrated circuit (IC) cards, generally called smart cards, are shaped and sized the same as magnetic stripe cards. Some kinds of smart cards without microprocessors are specifically called memory-type smart cards. Those memory-type smart cards are used for preserving data or information. Smart cards having microprocessors embedded therein may conduct highly complex functions such as logic determinations, arithmetic operations, and data protections by means of the microprocessors and built-in memories. Dialogic smart cards have embedded therein microprocessors, memories, input/output protocols, and application protocols, for bilaterally transferring information.

The smart cards can be utilized as reservoirs for storing personal information or as electronic purses. Therefore, the smart cards are required to have a high-degree of security for protecting data, which are stored therein, from external attacks. When such a smart card is communicating with a card reader through a communication line and a measuring device, such an oscilloscope, is connected to the communication line, however, it is possible for the data communication between the smart card and the card reader to be sensed and listened to. Through the sensing and listening of data communication between a smart card and a card reader, data stored in the smart card could be obtained by an unauthorized third party. For the purpose of enhancing a security level of the smart cards, it is necessary to provide advanced technology for preventing the sensing and listening of data communication between smart cards and card readers.

SUMMARY OF THE INVENTION

Exemplary embodiments of the present invention are directed to a smart card system that can detect an external attack.

An exemplary embodiment of the present invention provides a smart card system having: a smart card including a security logic circuit to detect an external attack; and a reader communicating with the smart card. The security logic circuit detects the external attack by measuring an external input capacitance through an input/output pad of the smart card and then comparing the external input capacitance to the input capacitance of the reader.

As an exemplary embodiment, the security logic circuit includes: an input/output driver providing a constant current to the input/output pad; and a capacitance measurer controlling the input/output driver to provide the constant current to the input/output pad for a predetermined time and, after providing the constant current to the input/output pad for the predetermined time, generating a control signal to inactivate communication with the reader if a voltage of the input/output pad is lower than a reference voltage. The input/output driver includes: a current source providing the constant current to the input/output pad; and a switching circuit providing a ground voltage to the input/output pad.

As an exemplary embodiment, the capacitance measurer includes a counter measuring a time for providing the constant current to the input/output pad. The capacitance measurer enables the counter in response to a capacitance measuring signal. The capacitance measurer compares the voltage of the input/output pad with the reference voltage if a count value of the counter reaches a predetermined value and generates the control signal if the voltage of the input/output pad is lower than the reference voltage.

According to an exemplary embodiment, the smart card transfers a predetermined capacitance value to the reader and the reader adjusts the input capacitance of the reader by the predetermined capacitance value.

Another exemplary embodiment of the present invention provides an operating method of a smart card system including a smart card and a reader, including the steps of: measuring an external input capacitance through an input/output pad; comparing the external input capacitance with an input capacitance of the reader; and inactivating communication to the reader if the measured external input capacitance is different from the input capacitance of the reader.

As an exemplary embodiment, the measuring is carried out by providing a constant current to the input/output pad for a predetermined time. The comparing is carried out by comparing a voltage of the input/output pad with a reference voltage. In an exemplary embodiment, the inactivating is carried out by resetting the smart card if the voltage of the input/output pad is lower than the reference voltage.

According to an exemplary embodiment, the method is further comprised of: before the step of measuring, transferring a predetermined capacitance value to the reader and adjusting the input capacitance of the reader in accordance with the predetermined capacitance value.

Another exemplary embodiment of the present invention provides an integrated circuit card comprising: a security logic circuit providing a current to a pad, measuring a voltage of the pad and generating a control signal when the voltage of the pad reaches a predetermined level; and an internal circuit communicating data with an external device and inactivating the communication in response to the control signal.

In an exemplary embodiment, the security logic circuit provides the constant current for a predetermined time.

As an exemplary embodiment, the security logic circuit measures capacitance coupled to the pad by providing a constant current during a predetermined period and measuring the voltage of the pad.

As an exemplary embodiment, the security logic circuit detects an external attack.

The smart card system according to exemplary embodiments of the present invention detects an external attack by measuring external input capacitance through an input/output pad and comparing the external input capacitance with an input capacitance of a reader. Thus, it improves the security level of the smart card system.

A further understanding of the nature and advantages of exemplary embodiments of the present invention herein may be realized by reference to the remaining portions of the specification and the attached drawings.

BRIEF DESCRIPTION OF THE FIGURES

Exemplary embodiments of the present invention will be understood in more detail from the following descriptions taken in conjunction with the following figures, wherein like reference numerals refer to like parts throughout the various figures unless otherwise specified. In the figures.

DETAILED DESCRIPTION OF EXEMPLARY EMBODIMENTS

Exemplary embodiments of the present invention will be described below in more detail with reference to the accompanying drawings.

A smart card system according to exemplary embodiments of the present invention measures an external input capacitance through input/output pads and then compares the external input capacitance with the input capacitance of a reader, thereby detecting an external attack. The facility of sensing the external attack contributes to improving the security level of the smart card system.

The present invention may be embodied in different forms and should not be construed as limited to the exemplary embodiments set forth herein. Rather, these exemplary embodiments are provided so that this disclosure will be thorough and complete, and will fully convey the scope of the present invention to those of ordinary skill in the art.

Figure 1:
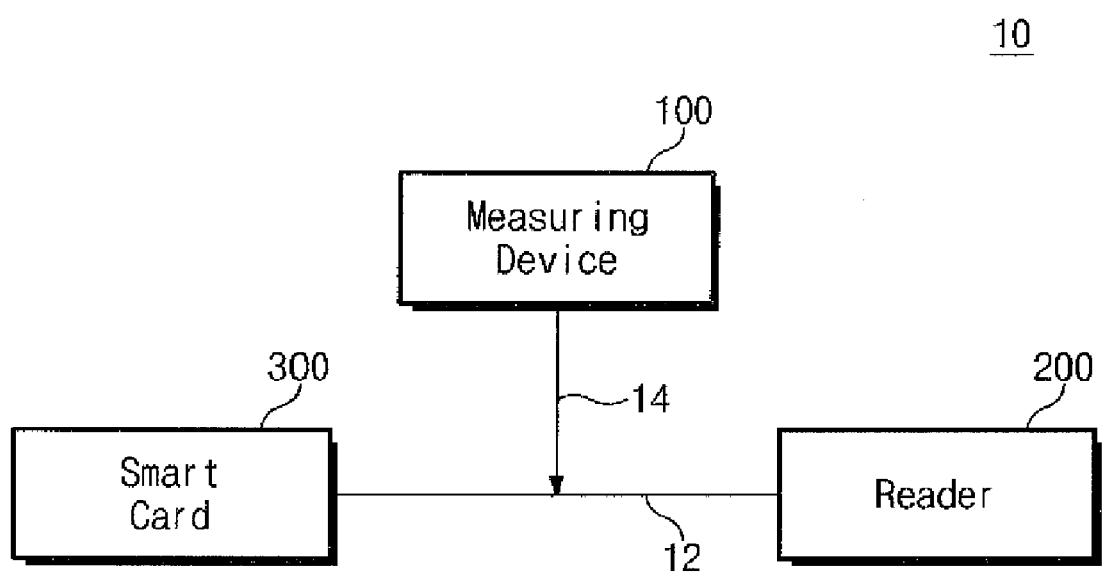
FIG. 1 is a block diagram of a smart card system according to an exemplary embodiment of the present invention.

FIG. 1 is a block diagram of a smart card system 10 according to an exemplary embodiment of the present invention. Referring to FIG. 1, the smart card system 10 is comprised of a measuring device 100, a (card) reader 200, and a smart card 300.

The measuring device 100 is an example of apparatus that may be used by an unauthorized third party for sensing and listening to a communication between the reader 200 and the smart card 300. The measuring device 200 may be connected to a communication line 12 between the reader 200 and the smart card 300. The measuring device 100 may hack the smart card 300 by analyzing a communication pattern between the reader 200 and the smart card 300. Exemplarily, the measuring device 100 may be an oscilloscope that is connected through a probe 14 to the communication line 12 between the reader 200 and the smart card 300.

The reader 200 communicates with the smart card 300 by way of the communication line 12. The reader 200 may conduct bilateral transmission of information with the smart card 300.

The smart card 300 communicates with the reader 200 also by way of the communication line 12. The smart card 300 may also conduct bilateral transmission of information with the reader 200. The smart card 300 according to exemplary embodiments of the present invention measures an external input capacitance. If only the smart card 300 is connected to the reader 200, the input capacitance of the reader 200 is obtained. If the measuring device 100 is additionally connected to the communication line 12 between the reader 200 and the smart card 300, a sum of the input capacitance from the measuring device 100 and the reader 200 is obtained.

The smart card 300 according to exemplary embodiments of the present invention compares a measured value of the external input capacitance with the input capacitance of the reader 200 and discriminates whether the measuring device 100 is connected to the communication line 12. In other words, the smart card 300 itself may detect an external attack. If the measuring device 100 is found as being connected to the communication line 12, the smart card 300 can inactivate communication with the reader 200.

Figure 2:
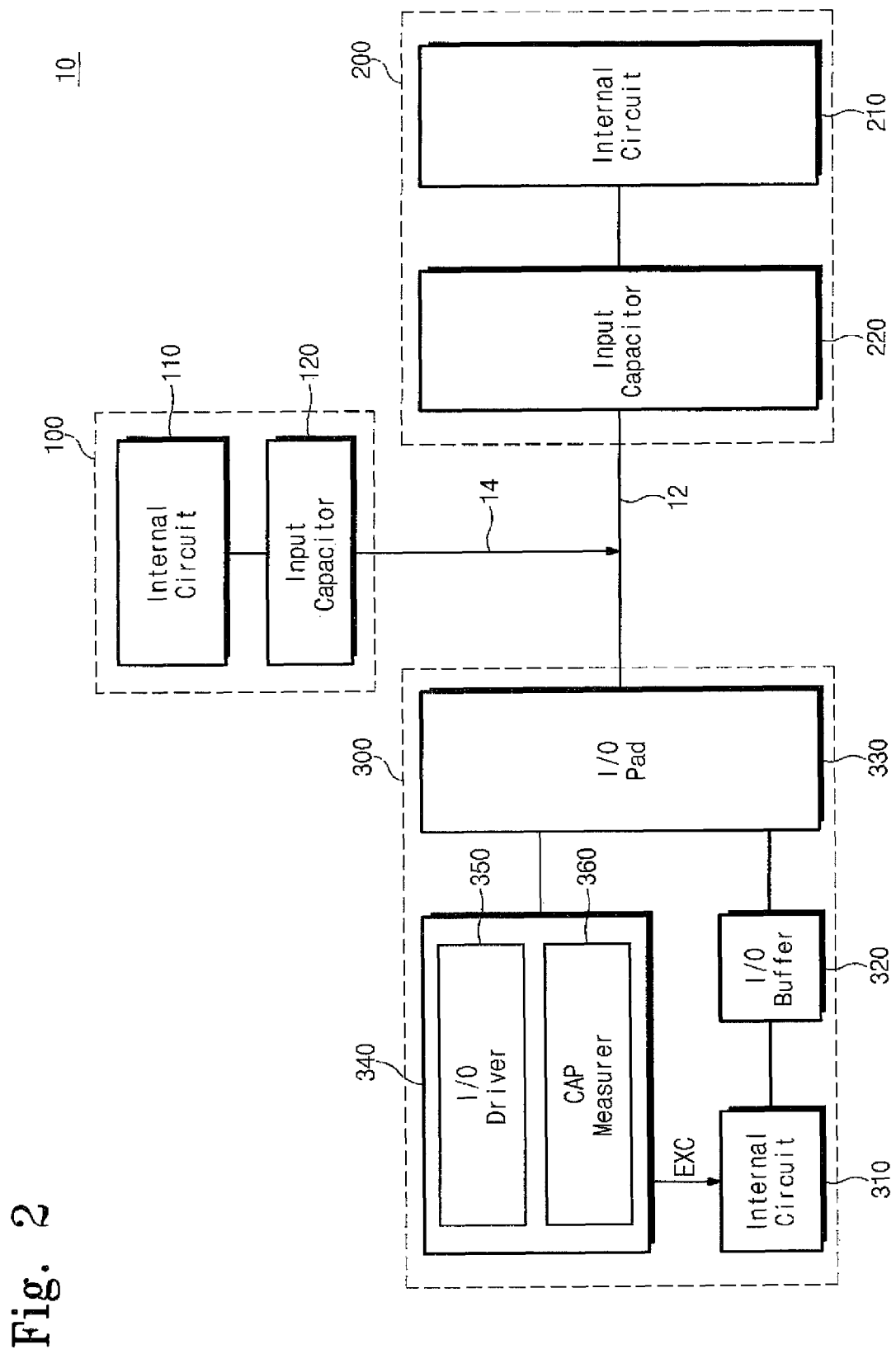
FIG. 2 is a diagram showing the smart card system of FIG. 1 in detail.

FIG. 2 is a diagram showing the smart card system 10 of FIG. 1 in detail. As shown in FIG. 1, the smart card system 10 is organized to include the reader 200 and the smart card 300.

The unauthorized measuring device 100 includes an internal circuit 110 and an input capacitor 120. The internal circuit 110 operates to analyze a communication pattern between the reader 200 and the smart card 300 by using the probe 14 connected to the communication line 12. The input capacitor 120 represents the input capacitance of the measuring device 100. In FIG. 2, the measuring device 100 is shown as having the input capacitor 120 as a separate component. But the present invention may not be restricted to this exemplary embodiment wherein the measuring device 100 has such a separate input capacitor 120. Additionally, it can be readily understood by those of ordinary skill in the art that the input capacitor 120 of the measuring device 100 may be a virtual capacitor with a capacitance value corresponding with the capacitance linked to the input/output pad 330 from the measuring device 100.

The reader 200 is formed to include an internal circuit 210 and an input capacitor 220. The internal circuit 210 communicates with the smart card 300 over the communication line 12. The input capacitor 220 is set to correspond with the input capacitance of the reader 200. While FIG. 2 shows that the reader 200 has a separately comprised input capacitor 220, the present invention may not be restricted thereto. It can be also understood by those of ordinary skill in the art that the input capacitor 120 of the reader 200 may be a virtual capacitor with a capacitance value corresponding with the capacitance linked to the input/output pad 330 from the reader 200.

The smart card 300 is comprised of an internal circuit 310, an input/output buffer 320, an input/output pad 330, and a security logic circuit 340. The internal circuit 310 is connected to the input/output buffer 320 and to the security logic circuit 340. The internal circuit 310 communicates with the reader 200 by way of the input/output buffer 320, the input/output pad 330, and the communication line 12. If a control signal EXC is provided from the security logic circuit 340, the internal circuit 310 inactivates or discontinues communication to the reader 200. Exemplarily, if the control signal EXC is applied to the internal circuit 310 from the security logic circuit 340, the internal circuit 310 may be conditioned to perform a reset operation. Otherwise, responding to the control signal EXC, the internal circuit may inform the reader 200 that there is a connection to the unauthorized measuring device 100 and inactivate communication to the reader 200. That is, the control signal EXC can be provided to the internal circuit 310 as an interrupt signal for inactivating communication between the smart card 300 and the reader 200. The internal circuit 310 may include a microprocessor, a memory, an input/output protocol, an application program, and so on. For example, the microprocessor of the internal circuit 310 may operate to inactivate communication between the reader 200 and the smart card 300 when the control signal EXC informs it of the connection to the unauthorized measuring device 100.

The input/output buffer 320 is connected to the internal circuit 310 and to the input/output pad 330. The input/output buffer 320 transfers data to the input/output pad 330 from the internal circuit 310. The input/output buffer 320 transfers data to the internal circuit 310 from the input/output pad 330. The input/output buffer 320 may include an input buffer and/or an output buffer (not shown).

The input/output pad 330 is connected to the reader 200, the input/output buffer 320, and the security logic circuit 340. The input/output pad 330 transfers data to the reader 200 from the input/output buffer 320 through the communication line 12. The input/output pad 330 also transfers data from the reader 200 to the input/output buffer 320 through the communication line 12. The input/output pad 330 is supplied with signals, which are used for detecting an external attack, from the security logic circuit 340.

The security logic circuit 340 is connected to the internal circuit 310 and the input/output pad 330. The security logic circuit 340 measures external input capacitance through the input/output pad 330. For instance, if the smart card 300 is simply connected to the reader 200, only the input capacitance of the reader 200 will be measured. As another example, if the smart card 300 is connected to the reader 200 and the measuring device 100 is present, a sum of the input capacitance from the measuring device 100 and the reader 200 will be measured. The security logic circuit 340 compares the measured external input capacitance with the known input capacitance of the reader 200. If the measured external input capacitance is different from the input capacitance of the reader 200, the security logic circuit 340 generates the control signal EXC fed to the internal circuit 310.

The security logic circuit 340 is organized to include an input/output driver 350 and a capacitance measurer 360. The input/output driver 350 supplies a constant current to the input/output pad 330. The capacitance measurer 360 controls the input/output driver 350 to provide the constant current for a predetermined time. After providing the constant current to the input/output pad 330 for the predetermined time, the capacitance measurer 360 checks a voltage level of the input/output pad 330. If a voltage level of the input/output pad 330 is higher than a predetermined voltage level, the capacitance measurer 360 inactivates the control signal EXC. In other words, the smart card 300 begins to communicate with the reader 200. If a voltage level of the input/output pad 330 is lower than the predetermined voltage level, the capacitance measurer 360 activates the control signal EXC that is provided to the internal circuit 310 to discontinue communication.

In summary, the security logic circuit 340 provides a constant current to the input/output pad 330 for a predetermined time, thereby increasing the voltage level of the input/output pad 330. During this operation, there may be a difference in a voltage elevation rate between the case that only the smart card 300 is connected to the reader 200 and the case that the smart card 300 is connected to the reader 200 along with the measuring device 100. The case that only the smart card 300 is connected to the reader 200 may be understood as such that the input/output pad 330 is coupled to the input capacitor 220. In this case, a voltage elevation rate at the input/output pad 330 may be relatively large.

The case that that the smart card 300 is connected to both the reader 200 and the measuring device 100 may be understood as such that the input/output pad 330 is coupled to the input capacitor 120 of the measuring device 100 and to the input capacitor 220 of the reader 200. During this operation, a voltage elevation rate of the input/output pad 330 may be smaller than that of the case that only the smart card 300 is connected to the reader 200. This is because the input capacitance in the case that the smart card 300 is connected to both the reader 200 and the measuring device 100 is larger than the input capacitance in the case that only the smart card 300 is connected to the reader 200.

The security logic circuit 340 according to exemplary embodiments of the present invention provides a constant current to the input/output pad 330 during a predetermined time, measures a voltage elevation rate at the input/output pad 330, and determines whether the smart card 300 has the measuring device 100 connected to it. Consequently, the security logic circuit 340 detects an external attack.

Figure 3:
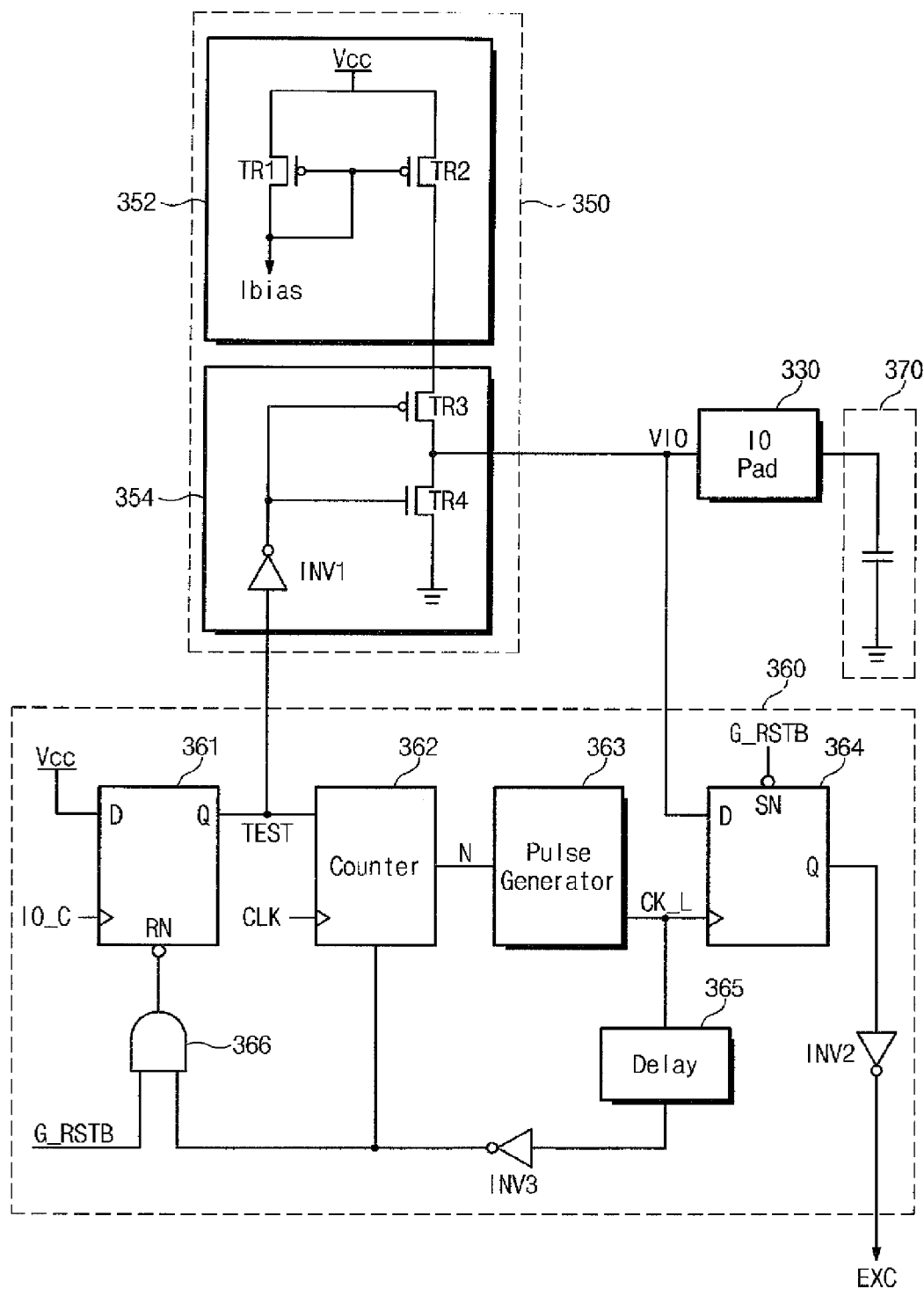
FIG. 3 is a circuit diagram showing an exemplary embodiment of the security logic circuit of FIG. 2.

FIG. 3 is a circuit diagram of an exemplary embodiment of the security logic circuit 340 of FIG. 2. Referring to FIG. 3, there are shown the input/output pad 330, the input/output driver 350, the capacitance measurer 360, and an external input capacitor 370. The input/output pad 330 has been previously described in conjunction with FIG. 2, so it will not be further detailed.

The external input capacitor 370 may be understood as a virtual capacitor having a capacitance value correspondent with capacitance linked to the input/output pad 330. Exemplarily, if the reader 200 is connected to the input/output pad 330, the external input capacitor 370 has a capacitance correspondent with the input capacitor 220 of the reader 200. On the other hand, if the measuring device 100 and the reader 200 are connected to the input/output pad 330, the external input capacitor 370 has a capacitance correspondent with a sum of the capacitance of the input capacitors 120 and 220 respective to the measuring device 100 and the reader 200. Therefore, the external input capacitor 370 is variable in capacitance in accordance with whether or not the input/output pad 330 is connected to the measuring device 100 through the probe 14 being connected to the communication line 12 shown in FIG. 2.

The input/output driver 350 supplies a constant current to the input/output pad 330 for a predetermined time in response to control by the capacitance measurer 360. The input/output driver 350 is comprised of a current source 352 and a switching circuit 354. The current source 352 provides a constant current. As illustrated in FIG. 3, the current source 352 is made up with a current mirror formed of a first pair of transistors TR1 and TR2 connected to a power source voltage Vcc. But the current source 352 according to exemplary embodiments of the present invention is not restricted to such a current mirror, which may be modified and/or reduced in various types of devices that need constant currents. The current mirror 352 provides the input/output pad 330 with a current in correspondence with a bias current Ibias from a bias current source (not shown).

The switching circuit 354 transfers a current to the input/output pad 330 from the current source 352 for a predetermined time in response to control of the capacitance measurer 360. The switching circuit 354 is formed by including a second pair of transistors TR3 and TR4 and an inverter INV1. If a test signal TEST applied from the capacitance measurer 360 is a logically high level, the transistor TR3 of the switching circuit 354 is turned on while the transistor TR4 of the switching circuit 354 is turned off. Then, in that state a current is supplied through transistor TR3 to the input/output pad 330 from the current source 352. If the test signal TEST is a logically low level, the transistor TR3 is turned off while the transistor TR4 is turned on. Then, in that state the input/output pad 330 is connected to ground through the transistor TR4 and it is discharged to the ground voltage.

As shown in FIG. 3, the switching circuit 354 is made up of the pair of transistors TR3 and TR4 and the inverter INV1.

But exemplary embodiments of the present invention may offer modifications or variable applications in forming the switching circuit 354.

The capacitance measurer 360 controls the input/output driver 350 to supply a constant current to the input/output pad 330 for a predetermined time. After supplying a constant current to the input/output pad 330 for a predetermined time, the capacitance measurer 360 compares a voltage level of the input/output pad 330 with a reference voltage level. If a voltage level of the input/output pad 330 is lower than the reference voltage level, the capacitance measurer 360 determines that the measuring device 100 is connected to the input/output pad 330 and generates the control signal EXC for inactivating communication to the reader 200.

The capacitance measurer 360 is exemplarily comprised of flipflops 361 and 364, a counter 362, a pulse generator 363, a delay circuit 365, an AND gate 366, and inverters INV2 and INV3. A capacitance measuring signal IO_C is applied to a clock input of the flipflop 361. The flipflop 361 inputs the power source voltage Vcc and outputs the test signal TEST. The test signal TEST is applied to the counter 362 and the switching circuit 354 of the input/output driver 350. A reset node RN of the flipflop 361 is connected to the output of the AND gate 366.

Although not shown in FIG. 2, the capacitance measuring signal IO_C may be supplied from the internal circuit 310. The capacitance measuring signal IO_C controls the capacitance measurer 360 to determine whether the measuring device 100 is connected to the input/output pad 330. In order to prevent communication disturbance between the smart card 300 and the reader 200, the capacitance measuring signal IO_C can be activated in an idle state and/or just before communication.

The capacitance measuring signal IO_C may be generated in a form of a unit pulse maintaining a high level during a time corresponding to a clock cycle. The operation that the capacitance measuring signal IO_C is provided to the flipflop 361 means that a clock of one cycle is applied to the clock input of the flipflop 361. Because an input D of the flipflop 361 is connected to the power source voltage Vcc, the flipflop 361 outputs the test signal TEST of a high level when the capacitance measuring signal IO_C is applied thereto. The reset node RN of the flipflop 361 is connected to the output of the AND gate 366. Thus, if the output of the AND gate 366 is a logically low level, the flipflop 361 outputs the test signal TEST of a low level.

A clock CLK is applied to a clock input of the counter 362. The clock CLK may be a generic one utilized within the smart card 300, or the clock CLK may be provided from an additional clock generator (not shown). The counter 362 is enabled in response to the test signal TEST. If the test signal TEST is set on a logical high level, the counter 362 begins to operate. When a count value from the counter 362 reaches a predetermined value, the counter 362 outputs a count signal N to inform of the attainment to the predetermined value. Exemplarily, the count signal N may be the most significant bit of the counter 362. The counter 362 initializes the count value in response to an output of the inverter INV3 that will be described hereinbelow.

The pulse generator 363 outputs a voltage comparison signal CK_L in response to the count signal N from the counter 362. The voltage comparison signal CK_L may be generated in a form of a unit pulse maintaining a high level for a time corresponding to a cycle of the clock CLK. That is, the voltage comparison signal CK_L operates in correspondence with one cycle of the clock CLK.

The voltage comparison signal CK_L is applied to the flipflop 364 and to a delay circuit 365.

The voltage comparison signal CK_L output from the pulse generator 364 is transferred to a clock input of the flipflop 364. The flipflop 364 receives a voltage level VIO from the input/output pad 330. More specifically, at the time of transferring the voltage comparison signal CK_L, if the voltage level VIO of the input/output pad 330 is lower than the input threshold voltage of the flipflop 364, the flipflop 364 outputs a logically low-level signal. Otherwise, at the time of transferring the voltage comparison signal CK_L, if the voltage level VIO of the input/output pad 330 is higher than the input threshold voltage of the flipflop 364, the flipflop 364 outputs a logical high-level signal. The output Q of the flipflop 364 is used as the control signal EXC for indicating whether the measuring device 100 is connected to the input/output pad 330. The reference voltage level may be the trigger voltage level of the flipflop 364 and may have a value between the level of VIO at T2 in FIG. 4A and the level of VIO at T2 in FIG. 4B.

To a set node SN of the flipflop 364 is applied an externally supplied global reset signal G_RSTB. When the smart card 300 is reset, the global reset signal G_RSTB is set to a low level. The global reset signal G_RSTB is otherwise always held on a high level except when the smart card 300 is reset. In other words, when the smart card 300 is reset, the output of the flipflop 364 is set to a logical high level and the control signal EXC is set to a logical low level.

The delay circuit 365 receives the voltage comparison signal CK_L from the pulse generator 363. An output of the delay circuit 365 is transferred to the counter 362 and the AND gate 366 by way of the inverter INV3. The AND gate 366 receives the global reset signal G_RSTB and an output of the inverter INV3. The output of the AND gate 366 is fed to the reset node RN of the flipflop 361 that resets the flipflop 361 and causes the test signal TEST to go to a low level, thereby ending the predetermined time.

Figure 4A:
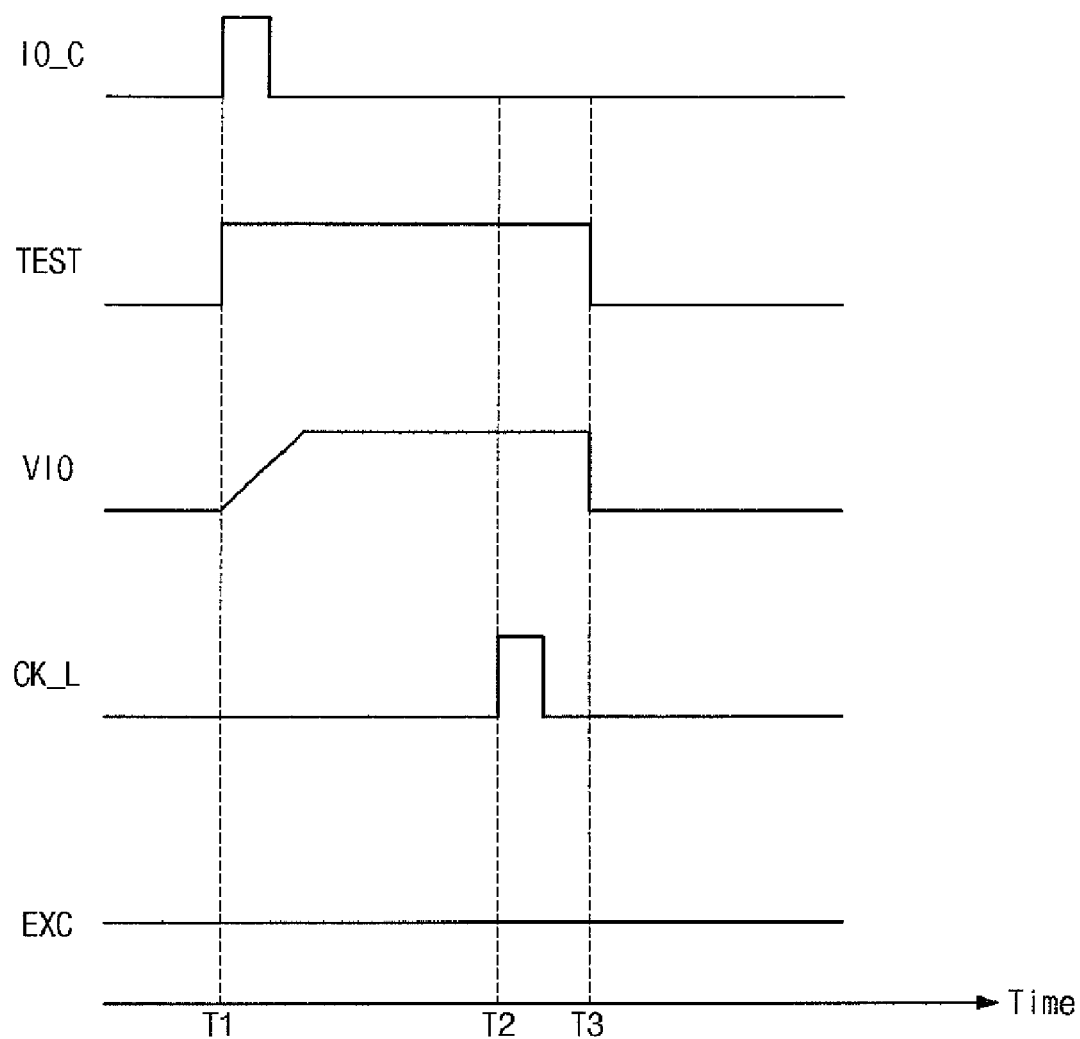
FIG. 4A is a timing diagram showing an operation of the security logic circuit when only a reader is connected to an input/output pad.
Figure 4B:
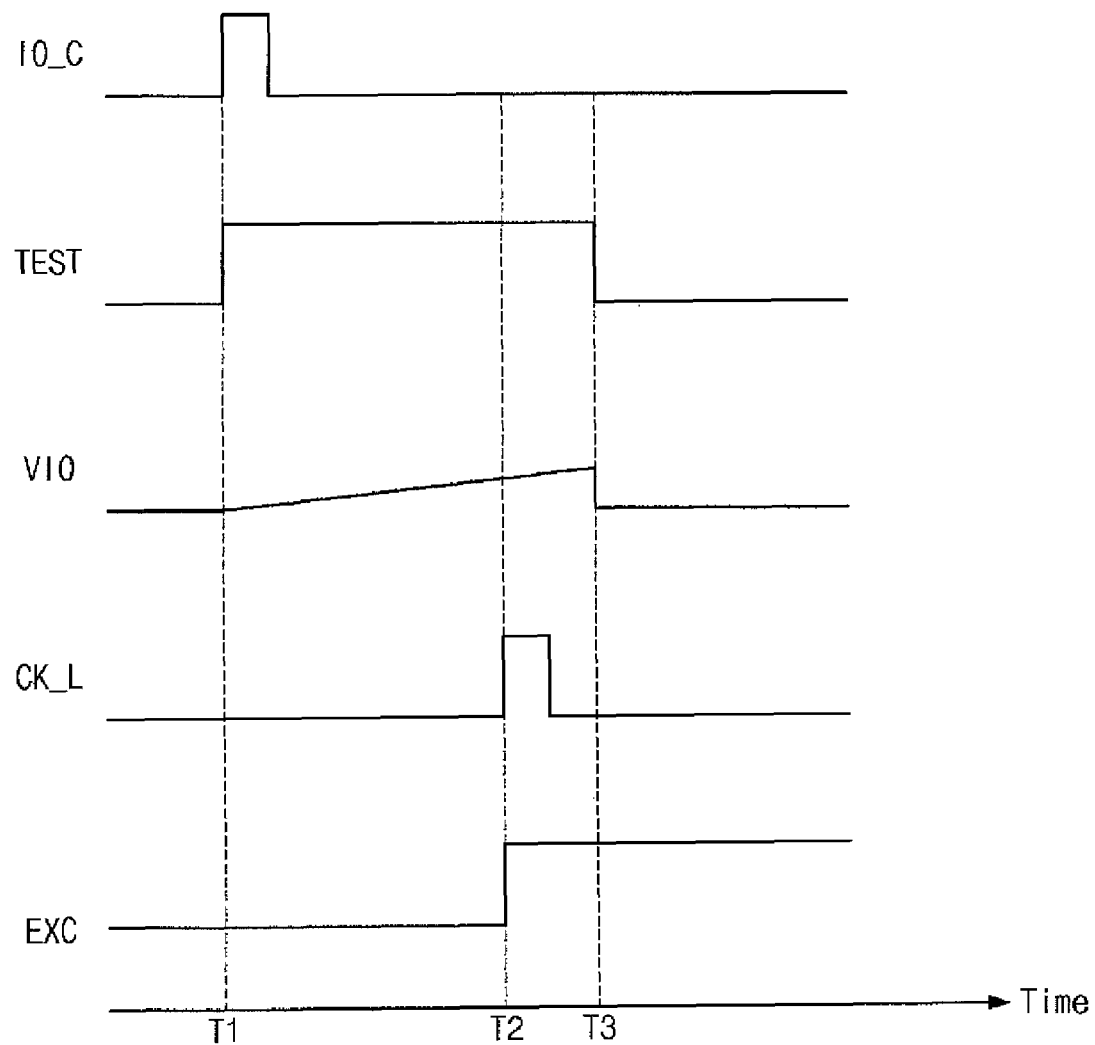
FIG. 4B is a timing diagram showing an operation of the security logic circuit when a reader and a measuring device are both connected to an input/output pad.
Figure 5:
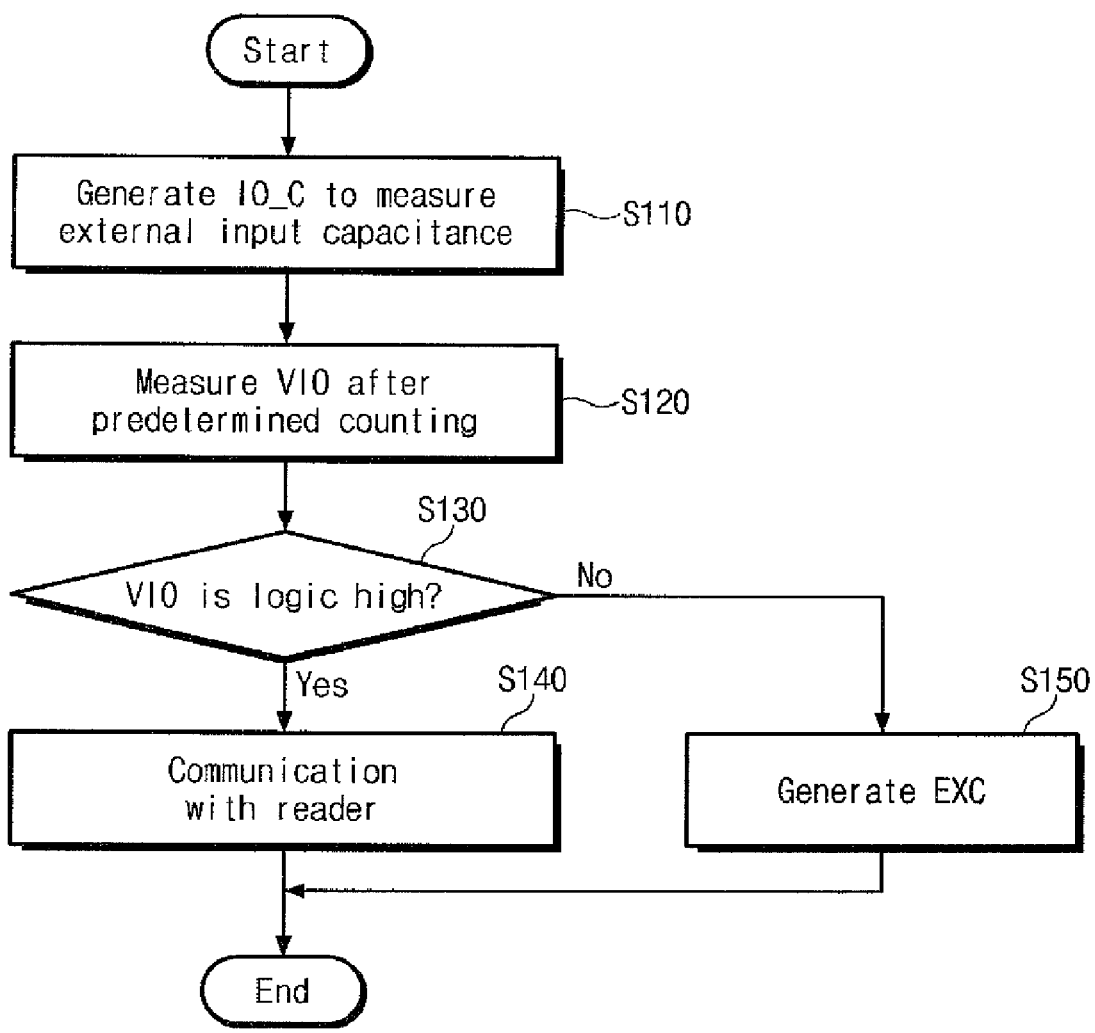
FIG. 5 is a flow chart showing the operation of the security logic circuit of FIG. 2.

FIG. 4A is a timing diagram showing an operation of the security logic circuit 340 of FIG. 2 when only the reader 200 is connected to the input/output pad 330. On the other hand, FIG. 4B is a timing diagram showing an operation of the security logic circuit 340 when both the reader 200 and the measuring device 100 are connected to the input/output pad 330. FIG. 5 is a flow chart showing the operation of the security logic circuit 340 of FIG. 2.

Hereinafter will be described an operation of the security logic circuit 340, referring to FIGS. 2, 3, 4A, and 5, for the case that only the smart card 300 is connected to the reader 200. If the smart card 300 is connected to the reader 200, the global reset signal G_RSTB is generated (G_RSTB is a logically complementary signal of G_RST that is not shown). Exemplarily, the global reset signal G_RSTB may be generated in response to a power-on reset.

As a logical high-level signal is transferred to the set node SN of the flipflop 364 in response to the global reset signal G_RSTB fed thereto, the flipflop 364 outputs a logical high-level signal. Thus, the control signal EXC is set to a logical low level by the action of the inverter INV2. As the output of the AND gate 366 is a logically low level, the test signal TEST at the output of the flipflop 361 is set to a logical low level.

Referring to FIG. 5, in a step S110, the capacitance measuring signal IO_C is generated to measure the external input capacitance through the input/output pad 330. In FIG. 4A, the capacitance measuring signal IO_C is shown as being generated at a time T1. The capacitance measuring signal IO_C can be generated from the internal circuit 310 shown in FIG. 2. For the purpose of preventing a disturbance in the communications between the reader 200 and the smart card 300, measuring the external input capacitance may be conducted in an idle state of communication therebetween or at a time before communication.

The capacitance measuring signal IO_C is provided to the clock input of the flipflop 361. The input D of the flipflop 361 is connected to the power source voltage Vcc, so the flipflop 361 outputs a logical high-level signal. Thereby, the test signal TEST is set on a logical high level as shown in FIG. 4A. The test signal TEST is applied to the counter 362 and to the input/output driver 350. The counter 362 begins its counting operation in response to the test signal TEST.

In the switching circuit 354, the transistors TR3 and TR4 are turned on and off, respectively, in response to the test signal TEST. Then, a constant current is supplied to the input/output pad 330 from the current source 352 when the test signal TEST is at a logical high level. In accordance with this constant current, the voltage VIO of the input/output pad 330 begins to rise, as shown in FIG. 4A. As will be seen from FIGS. 4A and 4B, if the measuring device 100 is connected with the input/output pad 330, the voltage VIO increases slowly compared with the case (FIG. 4A) that the measuring device 100 is not connected with the input/output pad 330.

Next, in a step S120, when a count value of the counter 362 reaches a predetermined value, a level of the voltage VIO at the input of the input/output pad 330 is measured against a reference voltage comprising a threshold voltage of flipflop 364. At a second time T2, if a count value of the counter 362 reaches the predetermined value, the counter 362 outputs the count signal N to the pulse generator 363, which outputs the voltage comparison signal CK_L in response to the count signal N. The voltage comparison signal CK_L is applied to the flipflop 364 and to the delay circuit 365.

Then, in a step S130, it is determined whether the voltage VIO of the input/output pad 330 is a logical high level or not. As the voltage comparison signal CK_L is applied to the clock input of the flipflop 364, the flipflop 364 generates an output signal in accordance with the voltage VIO of the input/output pad 330. If the voltage VIO of the input/output pad 330 is logical high level, that is, if the voltage VIO of the input/output pad 330 is higher than the reference voltage in the form of the trigger voltage level of the flipflop 364, the flipflop 364 outputs a logical high-level signal. Accordingly, the control signal EXC is set to a logical low level by the inverter INV2, thereby determining that the measuring device 100 is not connected to the input/output pad 330.

After providing a constant current to the input/output pad 330 for a predetermined time, during which the counter 362 counts clocks CLK so as to make the voltage VIO of the input/output pad 330 determined as being a logical high level. Additionally, after providing a constant current to the input/output pad 330 for a predetermined time, the counter 362 can be set in a bias and/or offset condition so as to make the voltage VIO of the input/output pad 330 determined as being a logical high level. Therefore, it can be also seen that the security logic circuit 340 is set to output a logical high-level signal from the flipflop 364 when the measuring device 100 is not connected to the input/output pad 330.

The delay circuit 365 delays the voltage comparison signal CK_L. At a time T3, an output of the delay circuit 365 is transferred to the counter 362 and to the AND gate 365 through the inverter INV3. The counter 362 initializes a count value in response to the output of the inverter INV3. The output of the AND gate 366 is fed to reset terminal RN to reset the test signal TEST, which is the output of the flipflop 361, to a logical low level in response to the output of the inverter INV3. Responding to the test signal TEST, the transistor TR3 of the switching circuit 354 is turned off while the transistor TR4 is turned on. Then, the input/output pad 330 is connected through transistor TR4 and discharged to the ground voltage.

Upon determining in step S130 that the input/output pad 330 is not connected to the measuring device 100, a step S140 is carried out. In the step S140, the smart card 300 conducts communication with the reader 200.

Hereinafter will be described an operation of the security logic circuit 340, referring to FIGS. 2, 3, 4B, and 5, for the case that the smart card 300 is connected to the reader 200 and the measuring device 100 is connected to line 12 of FIG. 2. The steps S110 and S120 are the same as in the case that the measuring device 100 is not connected to the input/output pad 330, so those will not be further described.

In the step S130, it is determined whether the voltage VIO of the input/output pad 330 is a logical high or low level. By applying the voltage comparison signal CK_L to the clock input of the flipflop 364, the flipflop 364 generates an output signal in accordance with a level of the voltage VIO fed to the input/output pad 330. If the voltage VIO of the input/output pad 330 is a logically low level, that is, if the voltage VIO of the input/output pad 330 is lower than the reference voltage, which is the trigger threshold voltage of the flipflop 364, the flipflop 364 outputs a logical low-level signal. Then, the control signal EXC is set to a logical high level by action of the inverter INV2, thereby determining that the measuring device 100 is connected to the input/output pad 330.

In the case that only the input/output pad 330 of the smart card 300 is connected to the reader 200, the external input capacitor 370 corresponds to the input capacitor 220 of the reader 200. In the case that the input/output pad 330 of the smart card 300 is connected to the reader 200 and the measuring device 100 is connected to communication line 12 as well, the external input capacitor 370 corresponds to the total capacitance by the input capacitors 120 and 220 of the measuring device 100 and the reader 200. In regard to the capacitance of the external input capacitor 370, in the case in which the input/output pad 330 is connected to both the measuring device 100 and the reader 200, the capacitance is larger than the case in which only the input/output pad 330 is connected to the reader 200. Thus, an elevation rate, or slope, of the voltage VIO of the input/output pad 330, in the case in which the input/output pad 330 is connected to both the measuring device 100 and the reader 200 is slower than the case in which only the input/output pad 330 is connected to the reader 200.

In the case in which only the input/output pad 330 is connected to the reader 200, if a constant current is supplied to the input/output pad 330 for a predetermined time, clocks CLK are counted in the counter 362 and/or a bias and/or an offset condition of the flipflop 364 is set, so as to make the voltage VIO of the input/output pad 330 determined as a logical high level.

On the other hand, in the case that the input/output pad 330 is connected to the measuring device 100 and to the reader 200, if a constant current is supplied to the input/output pad 330 for a predetermined time, the counter 362 can be set in a bias and/or an offset condition, so as to make the voltage VIO of the input/output pad 330 determined as a logical low level.

Consequently, it can be seen that the security logic circuit 340 of FIG. 2, formed of the I/O driver 350 and the capacitance measurer 360, is set to make an output level of the flipflop 364 variable in accordance with whether the measurement device 100 is connected to the input/output pad 330 through the probe 14.

If the input/output pad 330 is connected to the measuring device 100 and the reader 200, the voltage VIO of the input/output pad 330 is determined as being at a logically low level.

Then, as shown in FIG. 5 the control signal EXC is generated in a step S150. During this, as in the case that the input/output pad 330 is connected only to the reader 200, it initializes a count value of the counter 363, the test signal TEST, and the voltage VIO of the input/output pad 330.

Responding to the control signal EXC, that is, upon determining that the measuring device 100 is connected to the input/output pad 330, the smart card 300 inactivates communication to the reader 200. Exemplarily, the smart card 300 can be reset to inactivate the communication. The smart card 300 is also able to inform the reader 200 that the measuring device 100 is connected to the input/output pad 330, thereby inactivating communication to the reader 200.

Responding to generation of the capacitance measuring signal IO_C, the smart card 300 transfers a predetermined capacitance value to the reader 200. The reader 200 accepts the predetermined capacitance value and adjusts capacitance of the input capacitor 220 shown in FIG. 2 to the predetermined capacitance value. During this operation, the control signal EXC is set to a logical low level if the input/output pad 330 is connected only to the reader 200, but to a logical high level if the input/output pad 330 is connected to the measuring device 100 and the reader 200. Nevertheless, it can be understood that the smart card system and its operating method provided by exemplary embodiments of the present invention is adaptable to a smart card system associated with readers that are different from each other in input capacitance.

As described above, the smart card system according to exemplary embodiments of the present invention detects an external attack by measuring external input capacitance through the input/output pad and comparing the external input capacitance with the input capacitance of the reader. According to the present invention, the smart card system has an improved security level.

The above-disclosed subject matter is to be considered illustrative, not restrictive hereto, and the appended claims are intended to cover all such modifications, enhancements, and other exemplary embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A smart card system comprising:
a smart card including a security logic circuit to detect an external attack; and
a reader communicating with the smart card,
wherein the security logic circuit detects the external attack by measuring an external input capacitance through an input/output pad of the smart card and comparing the external input capacitance to an input capacitance of the reader,
wherein the security logic circuit comprises:
an input/output driver providing a constant current to the input/output pad; and
a capacitance measurer controlling the input/output driver to provide the constant current to the input/output pad for a predetermined time and, after providing the constant current to the input/output pad for the predetermined time, generating a control signal to inactivate communication between the smart card and the reader if a voltage of the input/output pad is lower than a reference voltage.

2. The smart card system of claim 1, wherein the input/output driver comprises:

a current source providing the constant current to the input/output pad; and
a switching circuit providing a ground voltage to the input/output pad instead of the constant current.

3. The smart card system of claim 1, wherein the capacitance measurer comprises a counter measuring a time up to the predetermined time for providing the constant current to the input/output pad.

4. The smart card system of claim 3, wherein the capacitance measurer enables the counter in response to a capacitance measuring signal.

5. The smart card system of claim 3, wherein the capacitance measurer compares the voltage of the input/output pad with the reference voltage if a count value of the counter reaches a predetermined value and generates the control signal if the voltage of the input/output pad is lower than the reference voltage.

6. A smart card system comprising:
a smart card including a security logic circuit to detect an external attack; and
a reader communicating with the smart card,
wherein the security logic circuit detects the external attack by measuring an external input capacitance through an input/output pad of the smart card and comparing the external input capacitance to an input capacitance of the reader;
wherein the smart card transfers a predetermined capacitance value to the reader and the reader adjusts the input capacitance of the reader by the predetermined capacitance value.

7. An operating method of a smart card system including a smart card and a reader, comprising:
measuring an external input capacitance through an input/output pad;
comparing the external input capacitance with an input capacitance of the reader; and
inactivating communication from the smart card to the reader if the external input capacitance is different from the input capacitance of the reader, wherein
before the measuring, transferring a predetermined capacitance value to the reader and adjusting the input capacitance of the reader in accordance with the predetermined capacitance value.

8. The method of claim 7, wherein the measuring is carried out by providing a constant current to the input/output pad for a predetermined time.

9. The method of claim 8, wherein the comparing is carried out by comparing a voltage of the input/output pad with a reference voltage.

10. The method of claim 9, wherein the inactivating is carried out by resetting the smart card if the voltage of the input/output pad is lower than the reference voltage.

11. An integrated circuit card comprising:
a security logic circuit providing a current to a pad, measuring a voltage of the pad and generating a control signal when the voltage of the pad reaches a predetermined level;
an internal circuit communicating data with an external device and inactivating the communication in response to the control signal;
wherein the security logic circuit further comprises:
an input/output driver providing a constant current to the input/output pad; and
a capacitance measurer controlling the input/output driver to provide the constant current to the input/output pad for a predetermined time and, after providing the constant current to the input/output pad for the predetermined time, generating a control signal to inactivate communication between the smart card and a reader if a voltage of the input/output pad is lower than a reference voltage.

12. The integrated circuit card of claim 11, wherein the security logic circuit measures a capacitance coupled to the pad by providing the constant current during the predetermined time and measuring the voltage level of the pad.

13. The integrated circuit card of claim 11, wherein the security logic circuit detects an external attack.

* * * * *